US008830037B2

(12) United States Patent
Burke et al.

(10) Patent No.: US 8,830,037 B2
(45) Date of Patent: Sep. 9, 2014

(54) IN VIVO RFID CHIP

(75) Inventors: Peter J. Burke, Irvine, CA (US); Christopher M. Rutherglen, Tustin, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 12/651,265

(22) Filed: Dec. 31, 2009

(65) Prior Publication Data

US 2010/0171596 A1 Jul. 8, 2010

Related U.S. Application Data

(60) Provisional application No. 61/141,833, filed on Dec. 31, 2008.

(51) Int. Cl.
*H04Q 5/22* (2006.01)

(52) U.S. Cl.
USPC .......................... 340/10.4; 600/528; 600/488

(58) Field of Classification Search
USPC ............ 340/10.1, 10.5, 13.26, 539.12, 572.1; 600/424
See application file for complete search history.

(56) References Cited

U.S. PATENT DOCUMENTS

| | | | | | |
|---|---|---|---|---|---|
| 5,963,144 | A * | 10/1999 | Kruest | ......................... | 340/10.1 |
| 7,224,576 | B2 * | 5/2007 | Hossick-Schott | ............. | 361/516 |
| 7,235,098 | B2 * | 6/2007 | Palmaz | ....................... | 623/1.15 |
| 7,333,013 | B2 * | 2/2008 | Berger | ..................... | 340/539.12 |
| 7,385,498 | B2 * | 6/2008 | Dobosz | .................... | 340/539.12 |
| 7,590,441 | B2 * | 9/2009 | Govari et al. | ................. | 600/424 |
| 7,640,048 | B2 * | 12/2009 | Dobbles et al. | ............... | 600/345 |
| 7,658,736 | B2 * | 2/2010 | von Alten | .................. | 604/890.1 |
| 7,787,958 | B2 * | 8/2010 | Stevenson | ..................... | 607/115 |
| 7,853,324 | B2 * | 12/2010 | Stevenson et al. | ................ | 607/2 |
| 7,914,468 | B2 * | 3/2011 | Shalon et al. | ................. | 600/590 |
| 7,916,013 | B2 * | 3/2011 | Stevenson | ............... | 340/539.12 |
| 7,986,227 | B2 * | 7/2011 | Yankelevitz et al. | .... | 340/539.12 |
| 8,115,618 | B2 * | 2/2012 | Robertson et al. | ....... | 340/539.12 |
| 8,199,020 | B1 * | 6/2012 | Kim | .............................. | 340/601 |
| 8,348,841 | B2 * | 1/2013 | Varadan | ........................ | 600/301 |
| 2004/0193020 | A1 * | 9/2004 | Chiba et al. | ................... | 600/300 |
| 2005/0096637 | A1 * | 5/2005 | Heruth | ........................ | 604/891.1 |
| 2005/0147559 | A1 * | 7/2005 | von Alten | ...................... | 424/9.1 |
| 2005/0247319 | A1 * | 11/2005 | Berger | .......................... | 128/898 |
| 2006/0079764 | A1 * | 4/2006 | Wright et al. | ................. | 600/431 |
| 2006/0212096 | A1 * | 9/2006 | Stevenson | ........................ | 607/60 |
| 2007/0134866 | A1 * | 6/2007 | Huang et al. | .................. | 438/199 |
| 2007/0138010 | A1 * | 6/2007 | Ajayan | .......................... | 204/400 |
| 2007/0179532 | A1 * | 8/2007 | Root et al. | ........................ | 607/2 |
| 2008/0058652 | A1 * | 3/2008 | Payne | ........................... | 600/488 |

(Continued)

OTHER PUBLICATIONS

Rutherglen et al., "Carbon Nanotube Radio", Nano Letters, vol. 7, No. 11, pp. 3296-3299 (2007).

(Continued)

*Primary Examiner* — Jennifer Mehmood
*Assistant Examiner* — Rufus Point
(74) *Attorney, Agent, or Firm* — One LLP

(57) ABSTRACT

An in vivo RFID chip implanted in a patient's body, comprising an integrated antenna formed on the chip, and a CMOS-compatible circuitry adapted for biosensing and transmitting information out of the patient's body. In preferred embodiments, the CMOS-compatible circuitry is adapted to sense a chemical and/or physical quantity from a local environment in the patient's body and to control drug release from the drug reservoirs based on the quantity sensed.

12 Claims, 7 Drawing Sheets

(56) References Cited

U.S. PATENT DOCUMENTS

| | | | |
|---|---|---|---|
| 2008/0194912 A1* | 8/2008 | Trovato et al. | 600/118 |
| 2008/0284599 A1* | 11/2008 | Zdeblick et al. | 340/572.1 |
| 2008/0306359 A1* | 12/2008 | Zdeblick et al. | 600/302 |
| 2009/0009332 A1* | 1/2009 | Nunez et al. | 340/572.1 |
| 2009/0095950 A1* | 4/2009 | Lieber et al. | 257/4 |
| 2009/0112191 A1* | 4/2009 | Boyden et al. | 604/891.1 |
| 2009/0124916 A1* | 5/2009 | Sweeney et al. | 600/528 |
| 2009/0256702 A1* | 10/2009 | Robertson et al. | 340/539.12 |
| 2010/0161004 A1* | 6/2010 | Najafi et al. | 607/60 |
| 2011/0169704 A1* | 7/2011 | Ajayan et al. | 343/708 |
| 2011/0276044 A1* | 11/2011 | Brommer et al. | 606/32 |
| 2011/0304430 A1* | 12/2011 | Brommer et al. | 340/8.1 |

OTHER PUBLICATIONS

Li et al., "Carbon Nanotube Transistor Operation at 2.6 GHz", Nano Letters, vol. 4, No. 4, pp. 753-756 (2004).

Peter Burke, "Quantitative Theory of Nanowire and Nanotube Antenna Performance", IEEE, 2006, Transactions on Nanotechnology, vol. 5, No. 4, pp. 314-334 (Jul. 2006).

Yu et al., "Synthesis of Aligned Arrays of Millimeter Long, Straight Single-Walled Carbon Nanotubes", Chem Mater., 16, pp. 3414-3416 (2004).

Guo et al., "A Small OCA on a 1 × 0.5-$mm_2$ 2.45-GHz RFID Tag—Design and Integration Based on a CMOS-Compatible Manufacturing Technology", IEEE Electron Device Letters, vol. 27, No. 2, pp. 96-98 (Feb. 2006).

Usami et al., "A 0.5 × 0.5 $mm_2$ RFID Chip with Easily Scaled-Down ID-Memory", IEEE International Solid-State Circuits Conference, Session 26, Non-Volatile Memories/26.6, pp. 482-483 (2007).

Usami et al., "Powder LSI: An Ultra Small RF Identification Chip for Individual Recognition Applications", IEEE International Solid-State Circuits Conference, Session 22, TD: Embedded Technologies/22.7, 10 pages (2003).

Abrial et al., "A New Contactless Smart Card IC Using an On-Chip Antenna and an Asynchronous Microcontroller", IEEE Journal of Solid-State Circuits, vol. 36, No. 7, pp. 1101-1107 (Jul. 2001.

Bouvier et al., "A Smart Card CMOS Circuit with Magnetic Power and Communications Interface", IEEE International Solid-State Circuits Conference, Session 17, TD: Low-Power/Low-Voltage Circuits, 3 pages (1997).

Jason Lester Hill, "System Architecture for Wireless Sensor Networks", Dissertation, UC Berkeley, UMI Microform 3105239, pp. 1-186 (Spring 2003).

\* cited by examiner

IN VIVO RFID CHIP

CROSS-REFERENCE TO RELATED APPLICATIONS

This application claims the benefit of U.S. provisional application Ser. No. 61/141,833, filed Dec. 31, 2008, which is fully incorporated herein by reference.

FIELD

The present invention relates to radio frequency identification (RFID) and, more particularly, to RFID-chip-based in vivo sensors.

BACKGROUND

For interrogation of biological systems, one is generally interested in a chemical or physical quantity. For a chemical quantity, typical assays determine the presence or concentration of a protein, antibody, or small molecule anylate, the presence or concentration of a particular DNA or RNA, or even more subtle quantities such as the phosphorylation state of an enzyme.

In general, these biomedically-relevant physical quantities are sensed and turned into a measurable optical or electronic signal. The use of electronic interrogation of biological function can be integrated into a silicon complementary metal-oxide-semiconductor (CMOS) chip at potentially low cost. However, the issue of how to interface the CMOS chip to the outside world must be resolved.

Many current implantable biosensors require a wire coming out of the patient, or a battery to be implanted. Also, typical biosensors are large and unsuited for a variety of applications that require minimal invasiveness. With respect to wireless transfer of information, antennas are either external, which add to the size of the system, or too big for applications in interrogation of biological systems. Efforts in reducing the size of antennas beyond a certain point are met by known technical drawbacks, which are discussed in further detail below.

RFID Technology

The field of RFID in general is a complex field, with many applications in industry, medicine, and commerce. Generally, overall size reduction is not the primary goal in industry applications; rather, cost is the most important factor. In addition, reducing the size of antennas often runs against textbook figures of merit, such as antenna gain, efficiency, and impedance.

With respect to RFID chips, companies such as Hitachi have developed technology for progressively smaller die sizes for RFID tags. See Usami, Sato et al., ISSCC (2003); Usami, Tanabe et al., ISSCC (2007). For example, the Hitachi μ-chip is 50×50×5 μm. See Usami, Tanabe et al., ISSCC (2007). This demonstrates the feasibility of small (microscopic) chips for RFID. However, the antenna used with the Hitachi μ-chip was external and added significantly to the system size. Although the Hitachi work has demonstrated very small die sizes for the memory, the antenna must be external, and is typically cm or so in size. This is generally achieved via an off-chip antenna.

Research regarding on-chip antennas has demonstrated the ability to fabricate smaller RF antennas on the same chip as the signal-processing components. Using either GHz near-field antenna or MHz inductively coupled coils, researchers have shown of order 1 mW of available DC power on chip (from the RF field) in a area of order 1 mm². See Guo, Popov et al., IEEE ELECTRON DEVICE LETT. 27(2), 96-98 (2006) ("Guo reference"). In the Guo reference, the researchers used an OCA operating at 2.45 GHz. The on-chip circuitry used the energy from the incoming RF field to power itself, so that no battery was needed. There, the researchers showed that 1 mW was available to power the on-chip circuitry, and the antenna size was roughly a few mm by a few mm. As can be seen from FIG. 1, the RFID tag chip 10 area is ~1×0.5 mm² and the antenna 12 is still much larger than the active circuitry of the Hitachi microchip 14 (which is not part of the RFID tag chip 10, but is only inserted for reference as to scale). Thus, while the Guo reference has demonstrated a major advance in integration and size reduction (compared to the cm scale external antennas typically used), there is still vast room for improvement in miniaturization of this RFID device.

Small Radios

FIG. 2 illustrates an embodiment of a carbon nanotube radio 20. This comprises an AM demodulator 22 made of a single carbon nanotube (a molecular tube with radius of order 1 nm). However, the external antenna 24 is several cm in length, and the audio amplifier, speaker, and power supply (battery) are off the shelf, so the entire system volume is of order $10^{-3}$ m³.

Table 1 contains a compilation of some representative sizes for the circuit, antenna, and complete radio system, from various scientific literature. See Bouvier, Thorigne et al., DIGEST OF TECHNICAL PAPERS, 44TH ISSCC, 1997 IEEE INTERNATIONAL (1997); Abrial, Bouvier et al., IEEE J. SOLID-STATE CIRCUITS 36(7), pp. 1101-07 (2001); Hill, Berkeley, Calif., Ph.D.: 166 (2003); Usami, Sato et al., ISSCC (2003); Rutherglen and Burke, NANO LETT. 7(11), 3296-3299 (2007); Usami, Tanabe et al., ISSCC (2007). The values represent estimates only, as most literature does not specify complete system volume. This comparison is meant to give an overview of various technical approaches (and so is not to be considered an "apples to apples" comparison), and to illustrate the state of the art and the relative importance of antenna volume in total system size. From this it is clear that the small circuit size is possible, but having a small antenna size is more challenging.

TABLE 1

Estimated circuit, antenna, and system size for various radios compiled from scientific literature

| | Circuit size (m³) | antenna size (m³) | System size |
|---|---|---|---|
| Hitachi | 1.E−14 | 1.E−08 | 1.E−08 |
| UCI CNT Radio | 1.E−23 | 1.E−05 | 1.E−03 |
| France-Telecom | 1E−09 | 1E−09 | 1E−09 |
| Smart Dust | 3.125E−09 | 1.E−06 | 1.E−06 |
| SMS | NA | NA | 1.E−06 |
| BioRasis | NA | NA | 5.E−09 |
| ISSYS | NA | NA | 1.E−06 |
| Potential single-chip radio | | | 1E−14 |
| Volume of single cell | | | 1E−18 |
| Potential nano radio | | | 1E−21 |

Table 1 also estimates the size of a possible single-chip radio using "COTS" (commercial off the shelf) technology, as well as possible advances using nanotechnology. In FIG. 3, the system size and single cell size of various existing and possible radio systems are shown.

The field of antenna studies which are smaller than an electrical wavelength is termed electrically small antennas. Researchers have proposed using novel quantum properties of a single carbon nanotube to make a resonant antenna with size about 100 times smaller than a classical dipole antenna for a given frequency. Such a concept is indicated schematically in FIG. 4 (Burke, Yu et al., IEEE TRANS. NANOTECHNOL. 5(4), 314-334 (2006)), where a nanotube antenna 40 is shown.

While the technology to build such prototype antennas exists (Li, Yu et al., NANO LETT. 4(10), 2003-07 (2004); Yu, Li et al., CHEM. MATER. 16(18), 3414-16 (2004)), the predicted losses due to ohmic currents in the arms of the antenna are severe. In principle, this loss can be overcome by higher intensity input radiation. However, this could result in significant heating of the antenna itself and possibly the surrounding tissue.

An approach to the absorption of RF power is to use it as a local heater, which can be used to effect biochemistry at the nanoscale for nanotechnology investigations and potential therapeutic applications. This is another form of "RF remote control" of biological function, which uses heat rather than circuitry to control chemistry. Two examples using various forms of RF nano-heaters include: therapeutic heaters and RF remote control.

In various other applications, however, a heating in the antenna may be undesirable or inappropriate. Also, as discussed above, there are other practical challenges and tradeoffs associated with attempts to decrease the size of an antenna. As an antenna gets smaller, textbook antenna metrics are sacrificed (e.g., antenna gain, optimum impedance, antenna Q schemes, and reader power). The losses in efficiency reduce the range of the antenna, which may be unacceptable for many applications in electronics.

SUMMARY

The various embodiments and examples provided herein are generally directed to a CMOS-compatible radio frequency identification ("RFID") chip, thinned from the backside, with an integrated antenna, as a platform for biosensing. A transmit function is built into the RFID chip using CMOS-compatible circuitry so the chip can send information back out of the body. The chip is physically small enough for non-invasive monitoring of patient heath as an implanted device. Power is provided by a power source from outside the body, so that the implantation can be permanent and requires no battery. Many different sensors can be integrated onto the chip. The chip can also be used to control the release of drugs, or to stimulate electrically biological function for either therapeutic or diagnostic purposes. The chip can be small enough that control at the single-cell level is possible.

Other objects and features of the present invention will become apparent from consideration of the following description taken in conjunction with the accompanying drawings.

BRIEF DESCRIPTION OF THE FIGURES

The details of the invention, both as to its structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

DESCRIPTION OF THE PREFERRED EMBODIMENTS

Each of the features and teachings disclosed below can be utilized separately or in conjunction with other features and teachings to provide RFID-chip-based in vivo sensors. Representative examples of the present invention utilizing many of the these additional features and teachings both separately and in combination, will now be described in further detail with reference to the attached figures. This detailed description is merely intended to teach a person of skill in the art further details for practicing preferred aspects of the present teachings and is not intended to limit the scope of the invention. Therefore, combinations of features and steps disclosed in the following detailed description may not be necessary to practice the invention in the broadest sense, and are instead taught merely to particularly describe representative examples of the present teachings.

The various embodiments and examples provided herein are generally directed to a CMOS-compatible radio frequency identification ("RFID") chip, thinned from the backside, with an integrated antenna, as a platform for biosensing. A transmit function is built into the RFID chip using CMOS and/or CMOS-compatible circuitry so the chip can send information back out of the body. The chip is physically small enough for non-invasive monitoring of patient health as an implanted device. Power is provided by a power source from outside the body, so that the implantation can be permanent and requires no battery. Many different sensors can be integrated onto the chip. The chip can also be used to control the release of drugs, or to stimulate electrically biological function for either therapeutic or diagnostic purposes. The chip can be small enough that control at the single cell level is possible.

Available conventional RFID technology does not adequately address the need for a biosensing platform that is small enough for non-invasive monitoring of patient health as an implanted device. In general RFID applications, a battery is typically required to power the RFID tag for two-way communications, and the antennas are either external to the chip (which adds to the size of the system) or fabricated with an eye toward antenna efficiency (i.e., a "good" antenna according to textbook antenna metrics would broadcast efficiently over a long range), rather than size. In contrast, a single-chip RFID platform as described herein provides a solution to the small size required for biomedical implants.

Using an electrically-small on-chip antenna integrated on a single-chip radio, some antenna gain may be sacrificed for small radio size. The benefits of a small single-chip platform, however, outweigh the disadvantages associated with textbook antenna metrics, especially in the technology vector for implantable biomedical microdevices, where small size is critical and communications occur over a short range.

Figure 1:
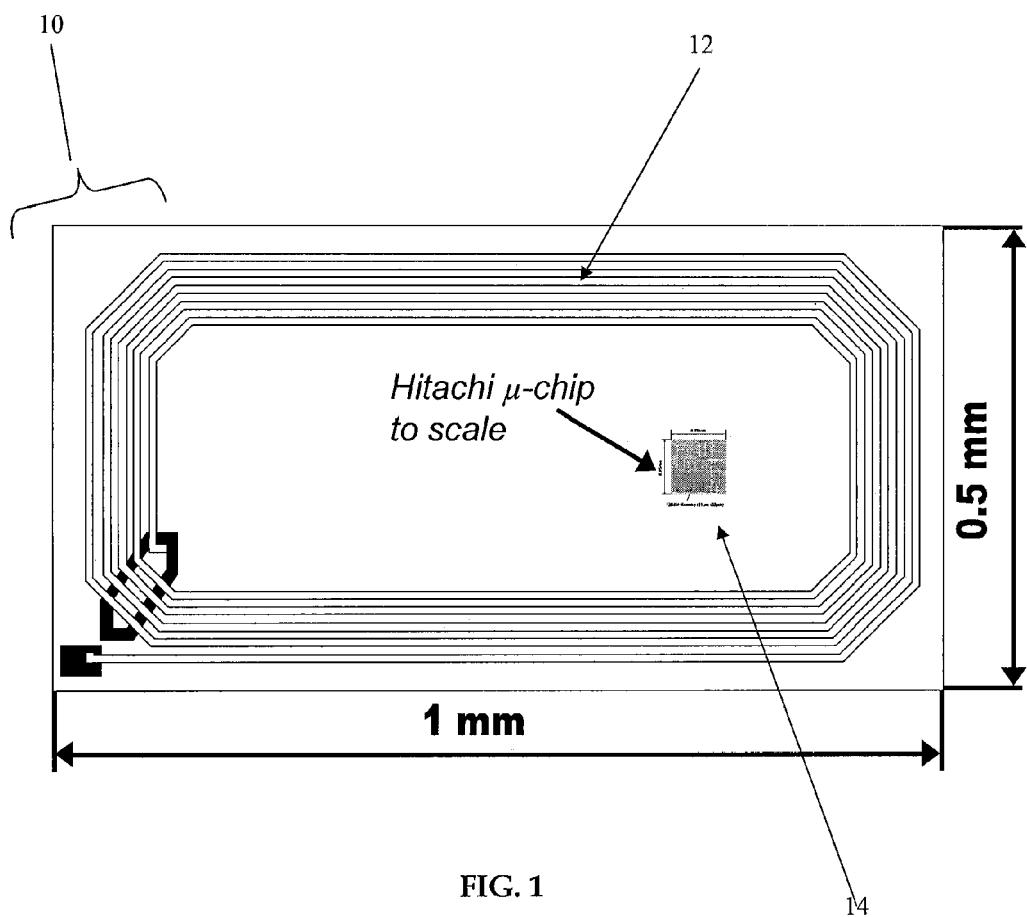
FIG. 1 is a top view of a RFID on-chip antenna shown with the Hitachi μ-chip to scale.
Figure 2:
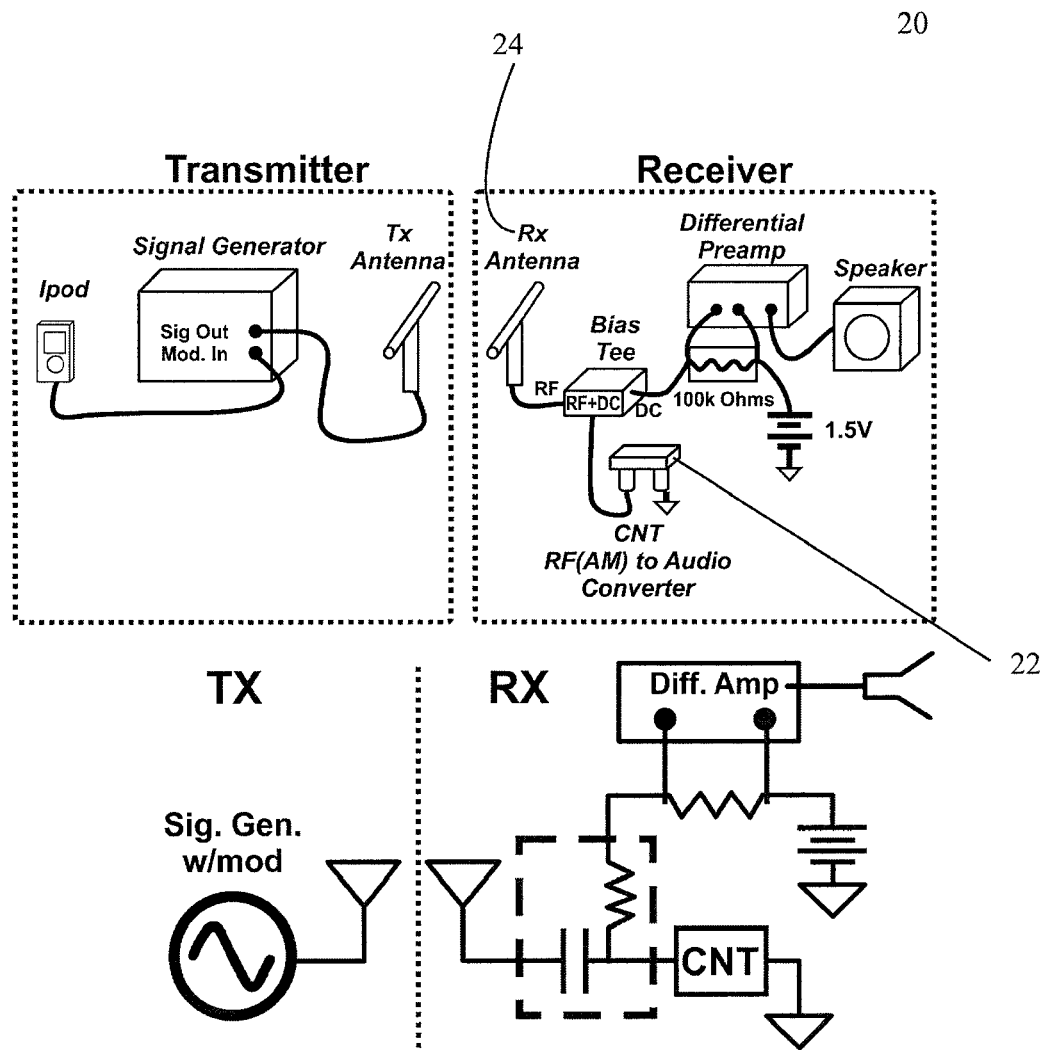
FIG. 2 is a schematic of a carbon nanotube radio.
Figure 3:
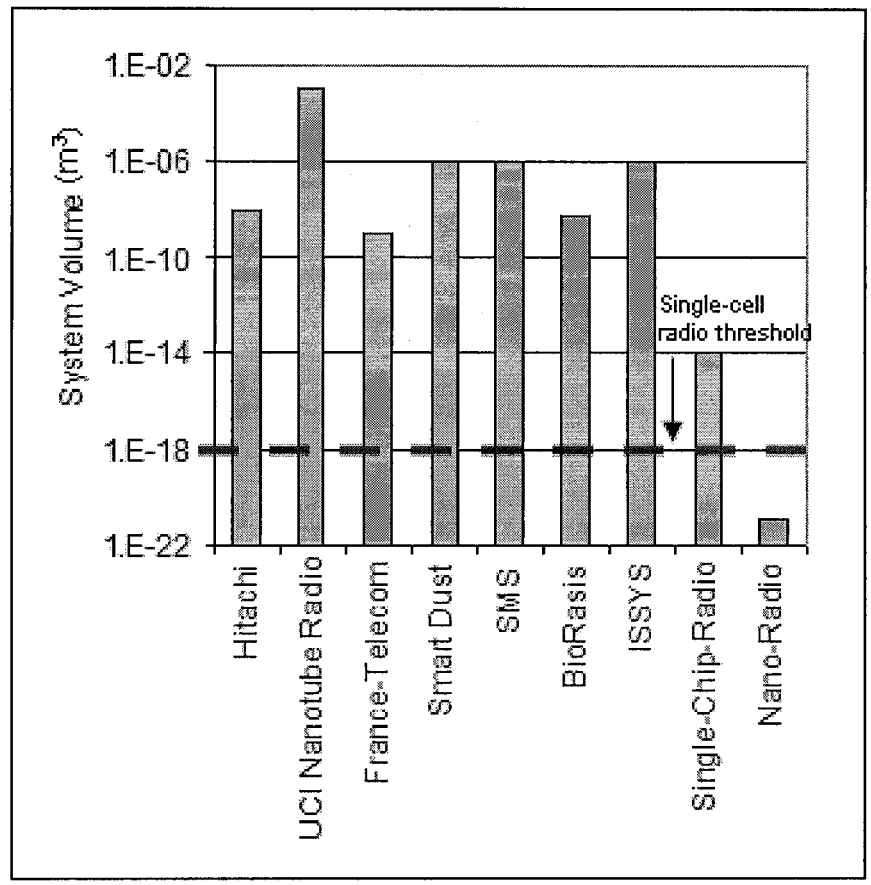
FIG. 3 is a graph illustrating the sizes of various existing and proposed radios.
Figure 4:
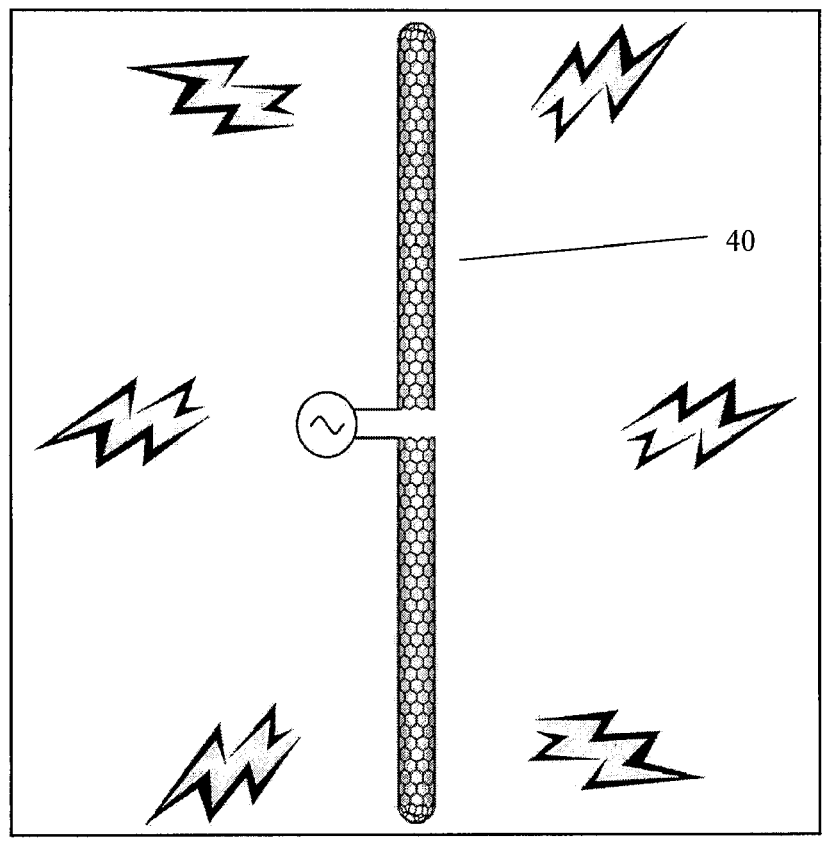
FIG. 4 is a schematic of a carbon nanotube antenna.
Figure 5:
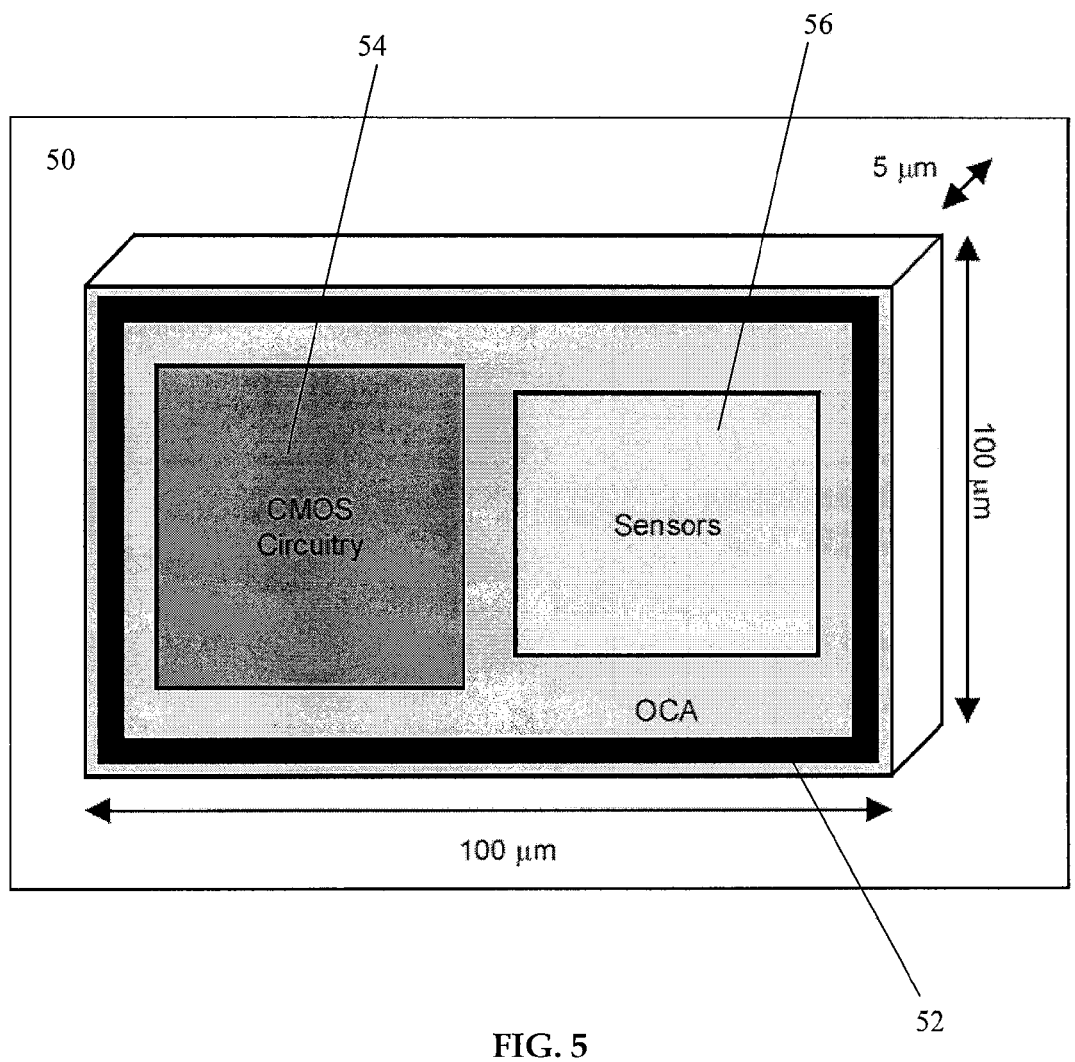
FIG. 5 is a schematic of a system using an antenna and a diode to receive radio. signals and to convert RF power to direct current.
Figure 6:
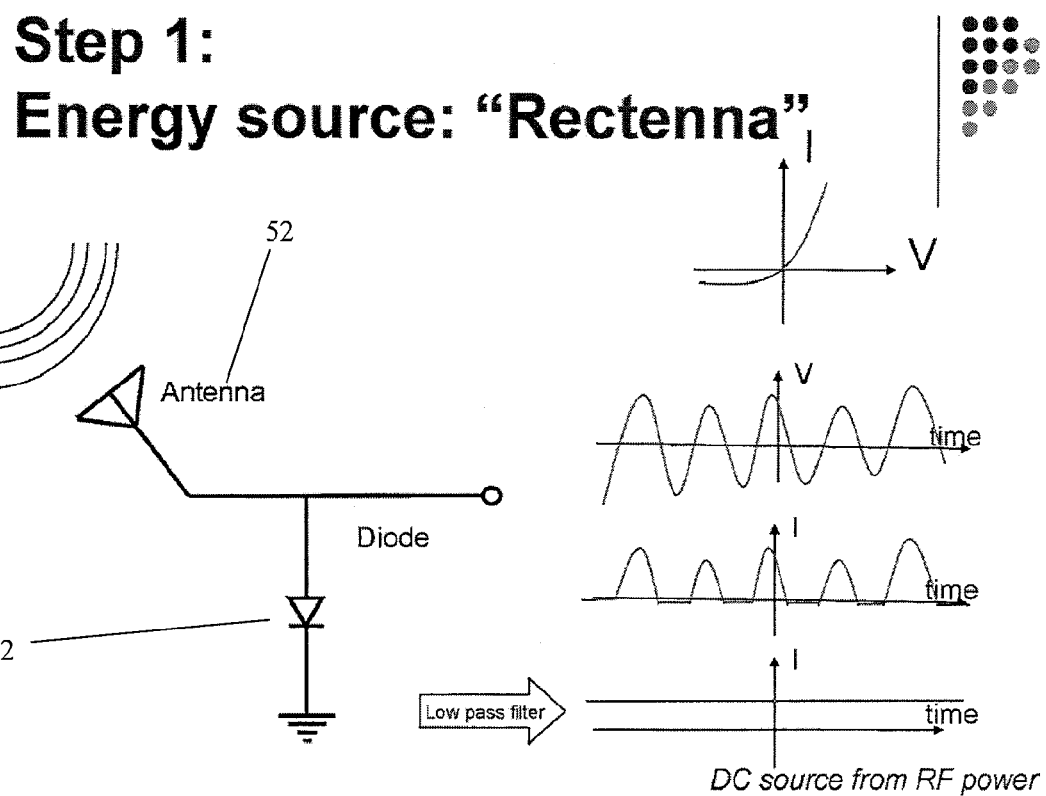
FIG. 6 is a schematic of a single-chip radio platform.

According to a preferred embodiment, a unified single-chip universal platform 50 is shown schematically in FIG. 5. Referring to FIG. 5, the on-chip antenna ("OCA") 52 can be designed and fabricated as an inductive coil with multiple loops on the chip (the loops are shown in aggregate). The antenna can be made out of a metal trace that is fabricated using CMOS standard and/or CMOS-compatible metal processes. In one embodiment, the area of the antenna can be scaled down to 0.1×0.1 mm$^2$, and the number of the loops can be increased to compensate for the decrease in size. Other embodiments of OCAs are also possible, including but not limited to spiral, linear, zigzag, meander, and loop antennas. Referring to FIG. 6, the OCA 52 can be integrated with a rectifier circuit (e.g., using a diode 62) to convert the AC power received by the OCA 52 into a DC voltage. The chip 50 also includes a CMOS-compatible RFID circuitry 54. The circuitry 54 can be designed for storing and processing information, modulating and demodulating a radio-frequency signal, and other specialized functions. By combining the CMOS-compatible RFID circuitry 54 with the OCA 52, an integrated system is achieved.

Such a platform enables the integration of various sensors 56 onto the chip 50. One of the advantages is that the chip 50 can act as a general purpose platform for communication into and out of a biological system. The CMOS-compatible circuitry 54 can be integrated with or otherwise connected to custom sensors 56 (e.g., nanowire sensors, electrochemical sensors, nanotube sensors) and can be adapted to work in conjunction with the sensors to receive and send information. For example, chemically-coated CMOS devices can sense local biochemical action and transmit that information outside the patient's body.

The chip can also be used to control the release of drugs, or to stimulate electrically biological function for either therapeutic or diagnostic purposes. Drug reservoirs can be integrated onto the RFID chip, allowing for intelligent or externally-controlled release of drugs. An exemplary application would be the use of glucose sensors for diabetes monitoring. Glucose sensors can be implanted in a patient to monitor blood sugar levels, and then control the release of insulin from an on-chip reservoir. This application allows the monitoring of blood sugar to occur on a more frequent (or even continuous) basis than the conventional method of testing that involves pricking the patient's finger and putting a drop of blood on a test strip once a day.

A proportional-integral-derivative ("PID") controller can be used to calculate the difference between the measured process variable and a desired setpoint and to adjust the process control inputs accordingly. Other algorithms that integrate biological information for the optimum health tailored to the individual patient may also be used. In general, there is a myriad of possible biological events to be monitored in vivo, using emerging sensing technologies. A single RF platform to interface to these new technologies would be a significantly accelerate the application of new sensing and nanotechnologies in the life sciences and biomedical device field.

According to a preferred embodiment, the width and length of the chip 50 can be 100 μm (or 0.1 mm) or less, and the thickness of the chip 50 can be 5 μm (0.005 mm) or less.

Two key components to reducing radio size are the antenna and the battery. Using the RF field to generate on-chip power obviates the need for a battery. Using an on-chip antenna 52 allows for smaller system sizes. Even with an on-chip antenna 52, the system sizes demonstrated to date and immediately feasible are dominated by the antenna size, not the circuitry. In addition to scaling down the area of the inductive coils, as discussed above, other methods can be adopted to reduce the size of the antenna. For example, nano-antennas can be used. A single chip (including antenna) radio system (with room for on-board sensors) of size 100 μm×100 μm by 1 μm is feasible with current technology. By scaling the antenna down further, single-cell RFID communication becomes possible.

Figure 7:
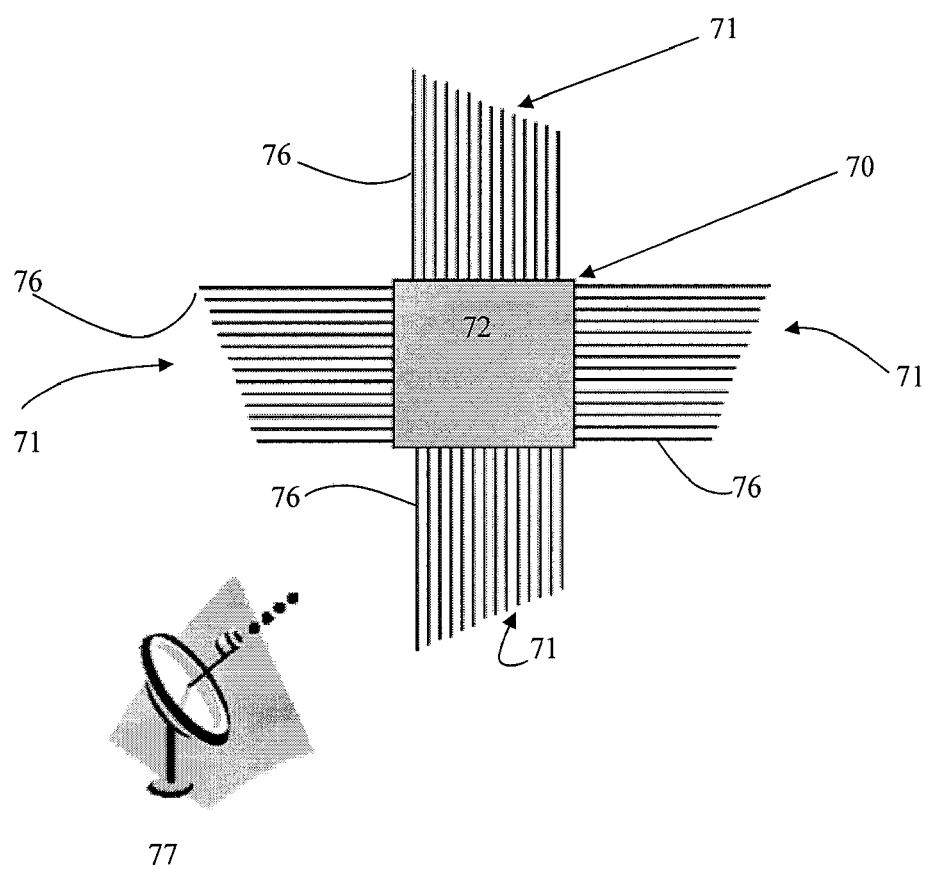
FIG. 7 is a schematic of a system incorporating integrated nanosystems.

Another exemplary embodiment is illustrated in FIG. 7. According to this embodiment, nanotube antennas and frequency domain multiplexing are used for high-bandwidth communication with integrated nanosystems, which comprises nanowires and nanotubes. Referring to FIG. 7, long nanotube antennas of different lengths, each resonant at a different frequency, are coupled to the integrated nanosystem. The CMOS-compatible RFID chip 70 has multiple nanostructure-based antennas 76, such as nanotube antennas, that together form antenna arrays 71 extending from each of the four sides of the chip 70. Preferably, each nanotube antenna 76 within the arrays 71 has a separate resonant frequency and is configured to communicate over a separate wireless frequency channel corresponding to that resonant frequency. In this manner, a multichannel communication signal transmitted from another device or outside system 77 can be received by the chip 70. Because each nanotube 76 within the arrays 71 receives information on a separate channel, each of the array 71 can act as a communication port where each antenna 76 effectively acts as an input/output connection.

The RFID chip 70 can have any number of nanotube antennas 76 configured to receive, transmit or both. In embodiments where each nanotube antenna 76 is tuned to a separate resonant frequency, the number of nanotube antennas 76 available to receive data on separate channels is limited only by the available bandwidth. The internal structure 72 of the chip 70 can range from simple nanotubes or nanoelectrodes to more complex integrated nanosystems having nanotubes, nanowires, nanotransistors, self-assembling DNA and the like.

The nanostructure-based antennas 76 can be formed from any nanoscale structure that acts as an antenna. In a preferred embodiment, nanostructure-based antennas 76 are formed from carbon single-walled nanotubes (SWNTs). Each carbon SWNT antenna 76 can be tuned to a resonant frequency by adjustment of its length. Additional exemplary embodiments of wireless interconnects for nanodevices and nanosystems are described in greater detail in co-pending application Ser. No. 11/573,443 (entitled "Interconnected Nanosystems"), which is incorporated herein by reference.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

The invention claimed is:
1. An in vivo RFID chip implanted in a patient's body, comprising:
    a silicon substrate,
    a CMOS-compatible circuitry,
    and an integrated antenna integrally formed on the silicon substrate with the CMOS-compatible circuitry as a unitary chip structure, wherein neither the length nor the width of the silicon substrate with integrated antenna and CMOS-compatible circuitry exceeds 100 um, wherein the CMOS-compatible circuitry is adapted for biosensing and transmitting information out of the patient's body;

wherein the CMOS-compatible circuitry is adapted to sense a chemical and/or physical quantity from a local environment in the patient's body and to control drug release from drug reservoirs based on the quantity sensed; and wherein the integrated antenna comprises a plurality of nanostructure based antennas, the nanostructure-based antennas formed from carbon single walled nanotubes (SWNTs).

2. The chip of claim 1, wherein the antenna is integrated with a rectifier circuit and supplies power to the chip by converting AC power into a DC voltage.

3. The chip of claim 1 further comprising drug reservoirs coupled to the CMOS-compatible circuitry.

4. The chip of claim 1, wherein the chip is powered by a power source from outside the patient's body.

5. The chip of claim 1, wherein the chip is adapted to electrically stimulate biological function in the patient's body.

6. The chip of claim 1, wherein the antenna comprises an inductive coil with multiple loops, wherein efficiency of the antenna is a function of the number of coil loops.

7. The chip of claim 1, wherein the antenna comprises at least one nanotube.

8. The chip of claim 1, wherein the CMOS-compatible circuitry is integrated with a plurality of sensors.

9. A method of interrogating biological systems, comprising the steps of:

implanting in a patient's body an RFID chip having a silicon substrate, the silicon substrate having a CMOS-compatible circuitry and an integrated antenna integrally formed thereon as a unitary chip structure, wherein neither the length nor the width of the silicon substrate with integrated antenna and CMOS-compatible circuitry exceeds 100 um, wherein the integrated antenna comprises a plurality of nanostructure based antennas, the nanostructure-based antennas formed from carbon single walled nanotubes (SWNTs);

sensing a physical and/or chemical quantity through a plurality of sensors integrated in the CMOS-compatible circuitry;

converting the physical and/or chemical quantity into a measurable signal;

transmitting the signal out of the silicon substrate via the integrated antenna on the RFID chip; and controlling drug release from drug reservoirs based on the physical and/or chemical quantity sensed.

10. The method of claim 9, wherein the antenna comprises an inductive coil with multiple loops, wherein efficiency of the antenna is a function of the number of coil loops.

11. The method of claim 9, further comprising the step of powering the RFID chip by a power source from outside the patient's body.

12. An in vivo RFID chip implanted in a patient's body, comprising:

a silicon substrate, a CMOS-compatible circuitry, and an integrated antenna integrally formed on the silicon substrate with the CMOS-compatible circuitry as a unitary chip structure, wherein neither the length nor the width of the silicon substrate with integrated antenna and CMOS-compatible circuitry exceeds 100 um, wherein the CMOS-compatible circuitry is adapted for biosensing and transmitting information out of the patient's body; wherein the CMOS-compatible circuitry is adapted to electrically stimulate a biological function in the patient's body; and wherein the integrated antenna comprises a plurality of nanostructure-based antennas, the nanostructure-based antennas formed from carbon single-walled nanotubes (SWNTs).

* * * * *